United States Patent [19]

Jacobson et al.

[11] 4,343,203

[45] Aug. 10, 1982

[54] ROTOR STRUCTURE FOR GYROSCOPIC APPARATUS

[75] Inventors: Peter E. Jacobson; Conrad M. Rustenburg, both of Phoenix, Ariz.

[73] Assignee: Sperry Corporation, New York, N.Y.

[21] Appl. No.: 812,296

[22] Filed: Jul. 1, 1977

[51] Int. Cl.² ............................................. G01C 19/06
[52] U.S. Cl. ........................................ 74/5 R; 74/572
[58] Field of Search ................. 74/5 R, 5.5, 5.6 D, 74/5.6 E, 5 F, 572, 5.47; 46/50, 75, 82, 209

[56] References Cited

U.S. PATENT DOCUMENTS

| | | | |
|---|---|---|---|
| 215,805 | 5/1879 | Corliss | 74/572 |
| 402,564 | 5/1889 | Collier | 74/572 |
| 1,161,178 | 11/1915 | Wobbe et al. | 74/572 X |
| 1,177,608 | 4/1916 | Dumond | 74/572 X |
| 1,426,336 | 8/1922 | Sperry | 74/572 |
| 1,908,187 | 5/1933 | Ross | 74/572 |
| 1,944,776 | 1/1934 | Arnold | 74/572 X |
| 2,199,024 | 4/1940 | Carter et al. | 74/5 R |
| 2,822,694 | 2/1958 | McKenney | 74/5.5 X |
| 3,137,966 | 6/1964 | Lohr | 46/50 |
| 3,327,538 | 6/1967 | Krupick et al. | 74/5 R |

FOREIGN PATENT DOCUMENTS

| | | | |
|---|---|---|---|
| 1374234 | 8/1964 | France | 74/574 |
| 736808 | 9/1955 | United Kingdom | 74/574 |

Primary Examiner—Rodney H. Bonck
Attorney, Agent, or Firm—Howard P. Terry

[57] ABSTRACT

A gyroscopic rotor device is designed to eliminate any spin bearing outer raceway distortion and/or axial preload changes due to centrifugal and thermal effects in a bimetal rotor assembly by means of judicial geometric shaping of the rotor components. The shaping of the heavy metal motor rim and/or the lower density metal rotor spin bearing support web interface includes a discrete number of stress concentrating pads and an equal number of holes formed in the bearing web opposite each of the pads for isolating any strain induced within the bearing web from the spin bearing outer race.

6 Claims, 6 Drawing Figures

STRAIN EFFECTS
WITH INVENTION

STRAIN EFFECTS
WITHOUT INVENTION

STRAIN EFFECTS
WITH INVENTION

ROTOR STRUCTURE FOR GYROSCOPIC APPARATUS

BACKGROUND OF THE INVENTION

1. Field of the Invention

The present invention relates to the design of gyroscopic devices and, more particularly, to the design of bimetal rotor assemblies for such devices.

2. Description of the Prior Art

It is well known that the requirements for a high performance gyroscope resides principally in the angular momentum of the gyro rotor. A desired angular momentum may be obtained by selecting the speed of the rotor for a desired rotor mass or vice versa. In some applications, it may be desirable to increase the rotor mass without increasing the rotor size, and thereby reduce the rotor speed for a given angular momentum. This may be accomplished by resorting to a bimetal rotor having a high density metal rim and a low density metal bearing support web.

Bimetal gyroscopes, that is, a gyroscope having a heavy metal outer ring or rim and light metal axially spaced spin bearing support webs for mounting the rotor for spinning about an axis and thereby providing increased inertia, are known in the prior art. However, bimetal gyroscopes are not as extensively used as might be expected especially in smaller gyroscopic devices such as described in U.S. Pat. No. 3,911,591, issued to Dohogne et al, also assigned to the present assignee, due to the differential thermal expansion characteristic between the heavy weight or high density metal rim and the lightweight or low density metal web which will cause a distortion in size and/or shape of the spin bearing outer raceway thereby deteriorating the gyro performance, reliability, and life expectancy. Furthermore, a bimetal gyroscope can experience unequal axial dimensional changes and/or bearing preload changes due to centrifugal force and thermal strain effects as the gyroscope is spun up to speed and/or exposed to varying temperature causing "oilcanning" of the rim support web. For example, if the influence from the changes of the compressive stress between rim and web is axially asymmetrical, e.g., the one side of the rotor assembly relative to the other side, then the gyroscope mass will tend to shift along the spin axis to thereby unbalance the rotor/rotor bearing frame assembly and cause unacceptable gyroscopic drift. Panel mounted aircraft instrumentation gyroscopes, such as shown in the above Dohogne et al patent, moreover, are spaced limited which generally prevents incorporation of radial expansion schemes.

Accordingly, there may be many applications for bimetal gyroscope rotors with means which eliminates spin bearing outer raceway distortion and axial dimensional changes due to thermal and centrifugal effects.

SUMMARY OF THE INVENTION

In accordance with the teachings of the present invention, the above-mentioned difficulties associated with bimetal gyroscopes are overcome. More particularly, a preferred embodiment of the invention comprises a gyroscopic device including a bimetal rotor adapted to spin about an axis in a rotor support housing or frame, the rotor having a high density metal outer ring or rim to provide a high angular momentum at reduced rotor speed and a pair of low density metal axially spaced rim support webs which in turn includes the outer race of the rotor spin bearings. Each end face of the rotor further includes a plurality of radially inwardly projecting pads equally spaced about the spin axis and forming a plurality of stress concentrating interfaces between the rotor rim and the bearing support webs. Each web includes a corresponding plurality of holes formed therein and disposed opposite each of the stress concentrating interface means for isolating the bearing outer race from any strains which would otherwise produce distortion and dimensional change due to thermal and centrifugal force effects during operation.

More specifically, the stress concentrating pads in combination with the holes formed within the web redirect the tangential and radial strain lines within the web to form closed loops encircling each of the stress relief areas such that the strain induced within the web enters the web from one of the stress concentrating pads, is directed by the hole opposite the corresponding pad to the next adjacent pad, and is then directed by the hole opposite the adjacent pad, in the direction towards the rim and through the adjacent stress pad to encircle the stress relief area and return to the pad from which it entered the web. In this manner, the stress relief areas in combination with the holes prevent the strain induced by the interference fit and any differential thermal expansion between the rim and the bearing support web from reaching the bearing outer raceway and thereby prevents bearing outer raceway distortion and/or dimensional change thereof.

The various features of novelty which characterize the invention are pointed out with particularity in the claims annexed to and forming a part of the specification. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
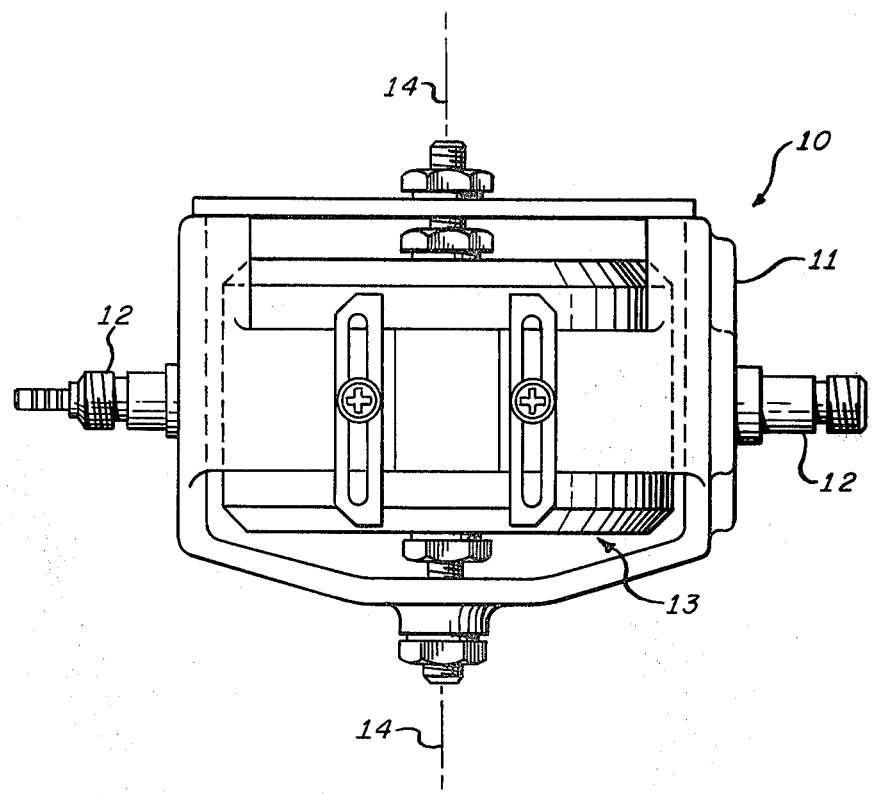
FIG. 1 illustrates a portion of a gyroscopic device including a rotor bearing frame with the bimetal rotor of the present invention mounted therein.

Referring now to FIG. 1, there is shown the pitch gimbal assembly of a typical panel mounted gyroscopic device 10 as used in aircraft indicating instruments, e.g., an aircraft attitude indicator of the type shown in the above Dohogne et al patent. This device includes a rotor housing or rotor bearing frame or gimbal 11, gimbal trunnions 12, and a rotor 13 supported within the housing for rotation about the rotor spin axis 14. The roll gimbal is omitted for clarity.

As stated above, in some applications, it is desirable to design gyroscopic devices, particularly panel mounted aircraft gyro instruments, to operate with reduced electrical power to avoid high temperature generation in an area in the aircraft that is already crowded with heat generating instruments. One way to do this and to maintain the design amount of inertia is to increase the rotor peripheral mass and correspondingly reduce rotor speed thereby reducing rotor drive current. Such considerations point to using a bimetal rotor design as briefly described above.

Figure 2:
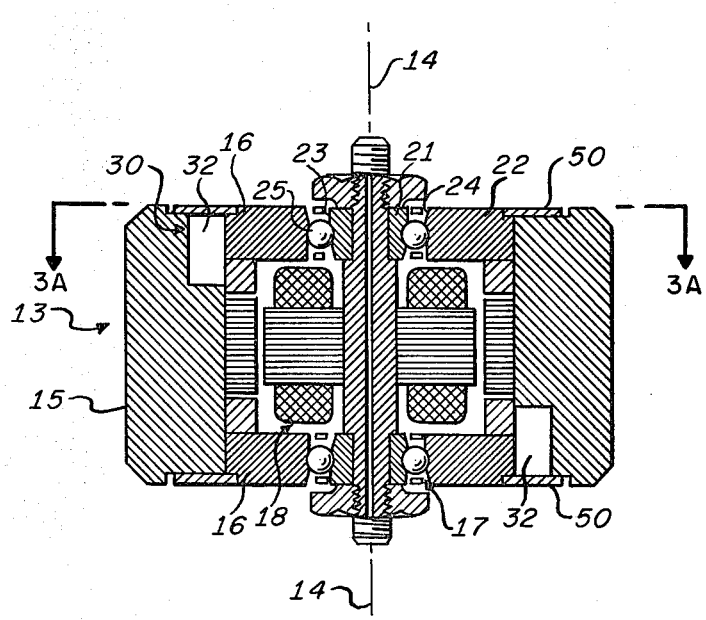
FIG. 2 illustrates in cross-section the bimetal gyroscope rotor of this invention.
Figure 3A:
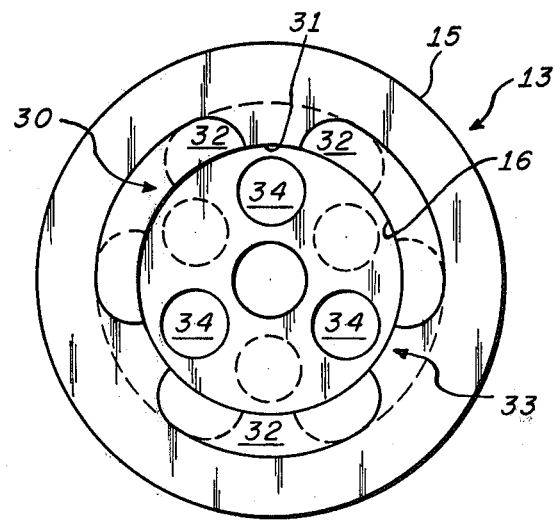
FIG. 3A is a plan view of the bimetal gyroscopic rotor of this invention.

The structural details of the rotor 13 is shown in FIGS. 2 and 3A. In general, it includes an outer rim 15 fabricated from a high density metal, such as a tungsten-silver alloy and coupled through a pair of axially spaced webs 16 fabricated from a lower density metal, such as conventional bearing steel to rotor bearing means 17. The bearing means comprises inner and outer raceways or bearing surfaces, for supporting the rotor assembly for spinning about the spin axis 14. Disposed within the annulus between the spin axis 14 and the rim 15 is a conventional drive motor 18 for spinning the rotor 13.

The bimetal rotor 13 is designed to incorporate a large inertia to weight ratio and a large inertia to size ratio in order to provide a high angular momentum at reduced rotor speed and thereby obviate the problems associated with thermal effects to be described herein. The large inertia to weight or large inertia to size ratio is achieved by distributing the maximum amount of mass toward the periphery of the rotor 13. The heavy weight metal outer rim 15 serves as the peripheral mass and supplies the desired large inertia; whereas, the light weight support webs 16 not only supports the heavy weight rim 15 for rotation but also combines therewith to form a bimetal rotor 13 wherein the maximum amount of mass is distributed toward the periphery of the rotor.

The bearing means 17 of the bimetal gyroscope rotor 10 of this invention includes inner and outer bearing rings 21 and 22 including inner and outer raceways 23 and 24, respectively, for bearing balls 25. The bearings 17 may include dynamically stabilized ball cages as disclosed in the present inventor's U.S. Pat. No. 3,918,778 for reducing gyro noise and vibration and increasing the reliability of the assembly. The outer bearing ring 22 as shown in this preferred embodiment of the invention is significantly extended in the radial dimension from the spin axis to form the rim support web 16.

As shown in FIGS. 2 and 3A, the rim 15 is generally a cylinder, the end faces of which are machined away or relieved as at 32 to a substantial depth both radially axially in such a manner as to leave on each side of the rotor a plurality of radially inwardly extending projections 33 equally annularly distributed about the interior periphery of the cylinder. These relieved rotor volumes may be referred to as stress relief volumes. There are three of these projections on each side of the cylinder so angularly spaced that they are located at zero, 120° and 240° positions on one side and at 60°, 180° and 300° positions on the other side. These projections may be referred to as rim stress concentrating pads. Each of the bearing webs 22 are generally disc shaped having a thickness less, in the preferred embodiment, than the axial depth of the rim cut outs 32. Each disc 22 has relatively large 120° spaced holes 34 drilled straight through it relatively close to the disc periphery. The webs 22 are assembled into the rim 15 with the holes 34 precisely radially aligned with the pads 33. Such assembly is with an interference fit whereby the pads 33 after assembly induce initial strain within the webs 22 as will be described. The rim stress concentrating pads 33 interface with the webs 16 and concentrate any internal rotor/web stresses at the angularly spaced discrete web rotor interfaces 31. The size of the holes 34 relative to the radial and axial dimensions of the pad 33 is a function of the magnitude of the stress and strain developed within the gyroscopic rotor over its operating environment range as will be described more fully below.

It will, of course, be understood that the bimetal rotor configuration of this invention may include a greater plurality of stress means 30 depending generally on the relative sizing and proportions of its components, the three areas as shown in the drawings provide an optimum for the rotor proportions illustrated.

Figure 4:
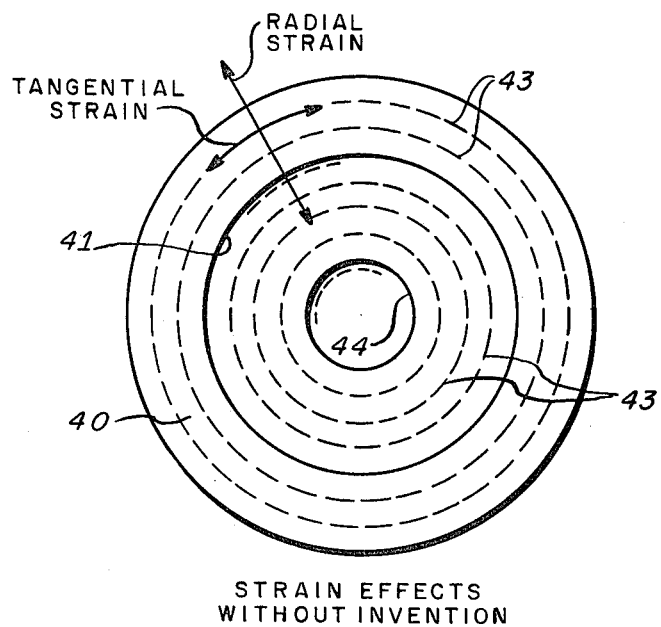
FIG. 4 is a schematic of a bimetal gyroscopic rotor showing idealized tangential strain lines and the induced dimensional change resulting therefrom without the present invention.
Figure 5:
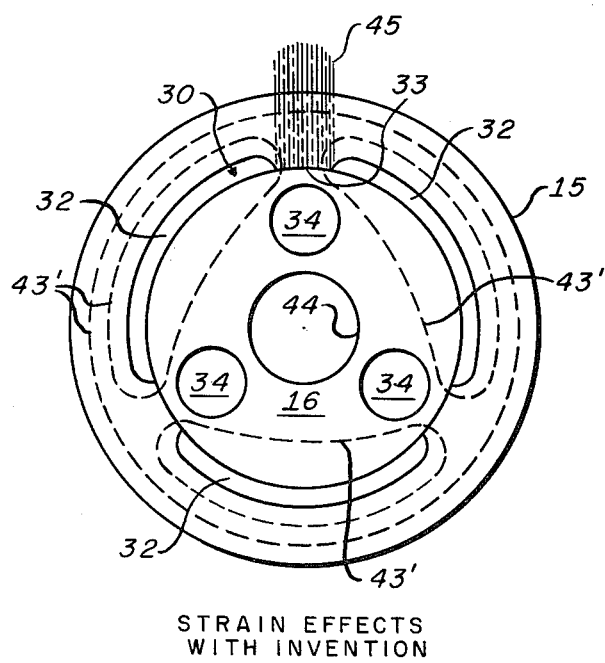
FIG. 5 is the schematic of the bimetal gyroscope rotor of the present invention illustrating the isolation of the bearing outer race by the redirection of the tangential strain lines induced within the web.

Referring now to FIGS. 4 and 5 there is schematically illustrated the strain line pattern of a bimetal rotor with and without the teachings of the present invention respectively. In FIG. 4, an idealized gyroscope rotor rim 40 is interference (thermally) fitted onto a web 41 producing an initial rotor/bearing interface stress resulting in the idealized tangential strain lines illustrated at 43, which, at zero rotational speed and a normal operating temperature establishes a radial compressive interface stress which holds the gyroscope together. This radial stress results in the tangential strain in both the rim and the web as illustrated by the idealized concentric lines 43 of FIG. 5. The radial stress magnitude is such that at zero rotational speed and the lowest operating temperature, the rim does not separate from the web.

One of the most significant normal operating environments for a gyro rotor is its thermal environment. When the rotor of FIG. 4 is subjected to a temperature increase, the coefficient of thermal expansion of the dense rim material, such as a tungsten steel alloy, is significantly less than that of the less dense web material, such as conventional bearing steel, and therefore the rim material expands less than the web material resulting in a reduction of the internal diameter 41 of the rim 40 relative to the external diameter of the web. The resultant increase of the radial compressive stress results in an increased radial strain within the web which reduces the inner diameter 44 of the bearing race, as indicated by the dotted lines in FIG. 5, thereby seriously affecting the bearing preload and ball loads and ultimate gyro performance and life. Furthermore, the idealized strain lines are not achievable in practice due to non-perfect dimensions of the rim and webs resulting not only in a change in the bearing race diameter but also in its roundness. A further deleterious result of the increased strain within the webs is the tendency of the webs to "oil can", that is, tend to strain out and change their axial positions at the bearing race. Since the webs cannot be made perfect in shape and identical in their response to these internal strains, they will tend to "oil can" unsymmetrically resulting not only in further affecting bearing preload but actually causing a shift in the rotor mass center of gravity and an attendant increase in gyro drift rate.

As shown in FIG. 5, the bimetal rotor design of this invention obviates the above problems by redirecting the strain lines developed by the interfacial pressure or stress at the rim and web interface such that the tangential and resulting radial strain induced by the outer rim is deflected from the radial direction and thus does not concentrate within the web at the outer bearing raceway. That is, as shown in FIG. 5, the interface pressure or stress illustrated as a force profile at 45 is developed at the discrete circumferentially small areas 33 formed by the relief volume 32 between the rotor rim 15 and the web 16. Thus, the strain developed by the rim induced pressure is now concentrated in discrete areas and therefore reduces the effects of any non-roundness of the rim. The holes 34 in the webs redirect the direct radial strain path to the bearing race 44 and effectively redirect the strain lines 43' developed within the web 16 away from the inner race. Accordingly, as shown in FIG. 5, the strain lines in the web 16 and the rim 15 form closed loops about the stress relief areas 32, to form a generally triangular pattern in the web 16 within the outer radial portion of the web 16 and are thereby prevented from approaching the internal area of the web, more specifically, the bearing outer raceway 24. The end result is to make the raceway 44 roundness, web 16 flatness, total bearing preload and rim 15 center of gravity axial position essentially insensitive to web 16, rim 15 interface pressure changes resulting from centrifugal and operating temperature changes.

As noted above, the size of the stress relief areas 32 and the holes 34 are proportioned to prevent any strain developed within the rotor 13 from affecting the bearing outer raceway 24. Further, it has been found that three equally annularly spaced concentrating pads 33 formed within the rim and three equally annularly spaced holes formed within the web 16 and radially aligned with the pads 33 provide optimum and economic assembly as well as optimum results with respect to the strain developed within the web and with respect to axial movement of the rotor with respect to the rotor assembly support. In effect, the stress relief areas 32 divide the inertia rim into a plurality of equally spaced radially acting spring-like members between the pads which tend to decrease the spring stiffness between the rim and the web at the pads 33 and which concentrate the strain lines along precisely controlled paths away from the bearing outer raceway 44. Furthermore, if more than three stress relief areas 32 are provided, then the effective length of this radially acting spring of the rim is decreased which increases the spring stiffness between the rim and the pads and in effect increases the strain induced within the web. Although the preferred embodiment of this invention indicates that the holes formed within the web are circular shaped, it has been found that if the width of the pad 33 is larger than the diameter of a circular hole to be formed within the web which hole provides sufficient web material between the pad and the hole and the bearing outer raceway and the hole, the hole may be formed in non-circular shape, such as an elliptical shape. Again the size of the hole formed within the web is a function of economics as well as dynamics. Circular holes are more easily formed than noncircular ones and care must be taken in selecting the shape and size of the holes so that they can withstand the stress concentration at the pads.

As shown in FIG. 2, the preferred embodiment of this invention also includes a cover 50 of thin metal, such as shim material disposed across the face of the bimetal gyroscopic rotor for covering the stress relief areas 32 and the holes 34. This cover is provided to reduce windage drag torques on the spinning rotor and whereby reduce rotor drive power. Alternatively, the windage caused by the spinning gyroscope may also be prevented by filling the openings 32 and 34 with a suitable elastic material.

Figure 3B:
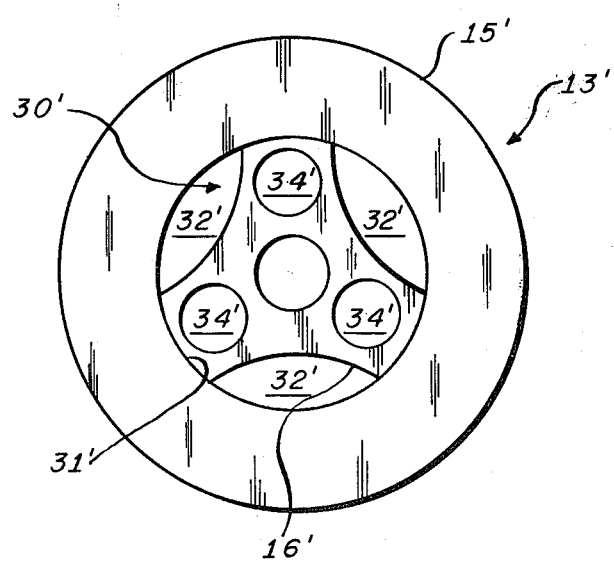
FIG. 3B is a plan view of an alternate embodiment thereof.

While in the preferred embodiment of FIG. 3A the stress relief volumes 32 are provided by machining out the rim 15, it will be understood that, in accordance with the modification illustrated in FIG. 3B, the periphery of the web 16 may be machined out as at 32' to provide the pads 31' and the holes 34' drilled in the web radially aligned with the pads 31'. Alternatively, the diameter of the outer periphery of web 16 may simply be reduced so as to leave the pads 31' at the original diameter.

While the invention has been described in its preferred embodiment, it is to be understood that the words which have been used are words of description rather than limitation, and that changes within the purview of the appended claims may be made without departing from the true scope and spirit of the invention in its broader aspects.

What is claimed is:

1. A gyroscope bimetal rotor assembly adapted to spin about an axis comprising
   a generally cylindrical rim member fabricated from a high density material and having a first coefficient of thermal expansion characteristic,
   a generally flat circular web member fabricated from a relatively lower density material and having a second, relatively higher coefficient of thermal expansion than said rim member,
   anti friction spin bearing means having a desired predetermined bearing preload in said web member adapted to support said assembly for spinning about said axis,
   interface means between said rim member and said web member for maintaining the mechanical integrity of said rim and web members over an operating temperature range, said interface means comprising
   a plurality of annularly distributed interface pads on one of said members formed by relieving a diameter thereof between said pads, said pads concentrating stress forces produced by thermal expansion of said members at said pads, and
   a corresponding plurality of annularly distributed holes in said web member in radial alignment with said pads, whereby said holes direct said stress forces toward the adjacent pads and away from said bearing means thereby substantially preventing deformation of said bearing means and deleterious changes in said bearing preload over said operating temperature range.

2. The gyroscope rotor according to claim 1 wherein said interface pads are formed on an internal diameter of said rim.

3. The gyroscope rotor according to claim 1 wherein said interface pads are formed on an exterior diameter of said web.

4. The gyroscope rotor according to claim 1 wherein said rotor includes at least a pair of said interface means axially spaced along said axis and wherein said annularly distributed interface pads of one of said interface means are angularly staggered relative to those of the other of said interface means.

5. A gyroscope rotor according to claim 1 wherein the diameter of said holes is approximately equal to the annular length of said pads.

6. The gyroscope rotor according to claim 5 wherein said web holes are circular.

* * * * *